Patented Nov. 1, 1949

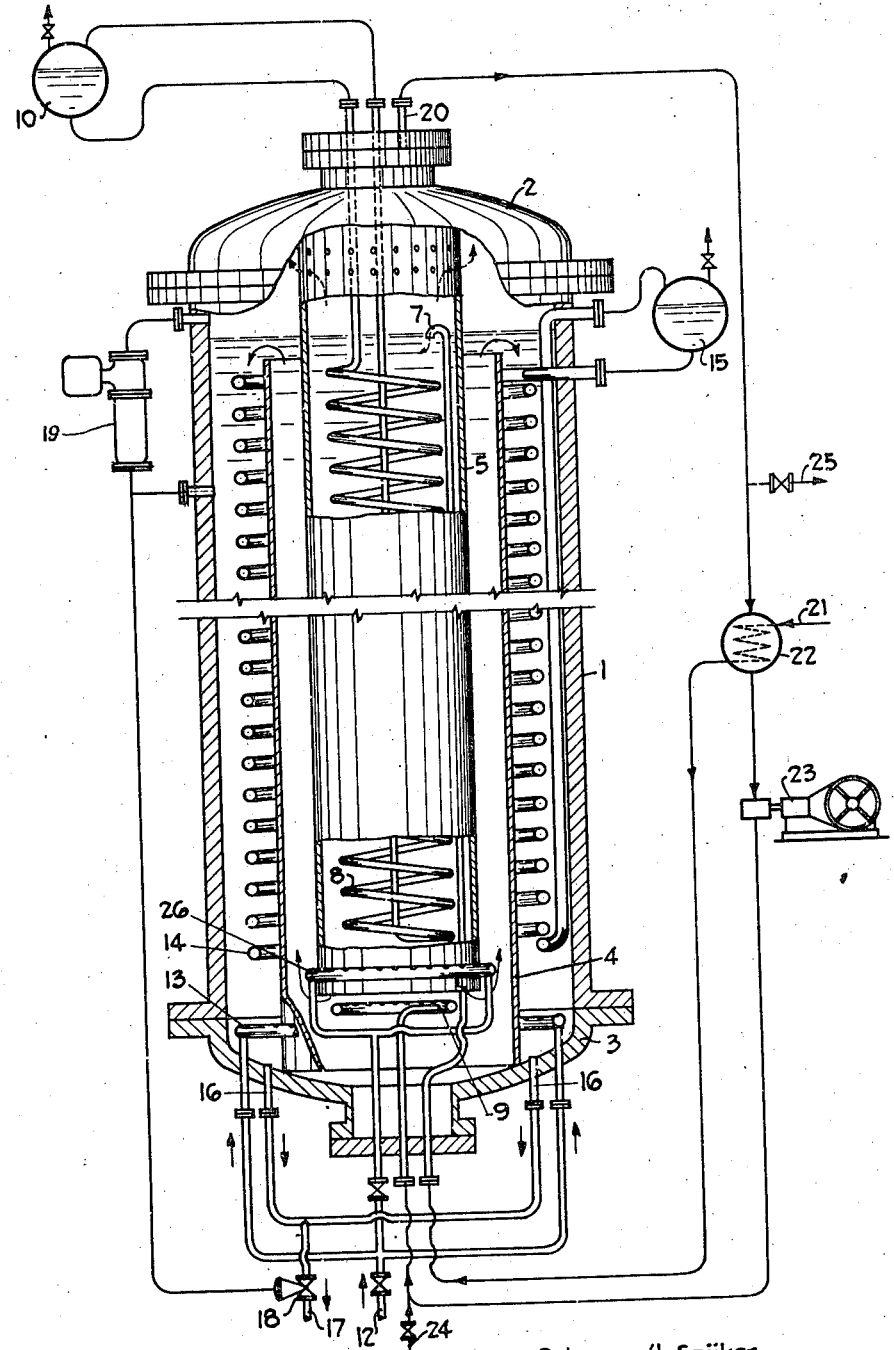

2,486,693

UNITED STATES PATENT OFFICE 2,486,693

METHOD FOR THE SYNTHESIS OF CARBINOLS

Peter van't Spijker, The Hague, Netherlands, and John Alfred Sherred, Houston, Tex., assignors to Shell Development Company, San Francisco, Calif., a corporation of Delaware Application January 3, 1948, Serial No. 434
In the Netherlands, January 15, 1947

3 Claims. (Cl. 260—638)

This invention relates to an improved method and apparatus for the synthesis of carbinol derivatives by the addition of carbon monoxide and hydrogen to unsaturated organic parent compounds. For example, a preferred embodiment of the invention relates to an improved method and apparatus for the synthesis of alcohols by the catalized addition of carbon monoxide and hydrogen to unsaturated hydrocarbons.

It is already known to produce carbinol derivatives by treating alkenes or other suitable unsaturated parent substances, e. g. alkadienes, alkines and unsaturated aldehydes, alcohols, esters, acids, etc., with carbon monoxide and hydrogen under pressure in the presence of a suitable catalyst. See for example U. S. Patents Nos. 2,003,477–1,973,662–2,327,066. It is also already known that in order to produce the best yields of such derivatives it is desirable to carry out the synthesis in two steps or stages. In the first stage one mole of carbon monoxide and one mole of hydrogen are added at the unsaturated ethylenic or acetylenic linkage of the parent substances to produce the corresponding aldehydic addition compound according to the known oxo-reactions and part of this is converted to the corresponding carbinol by the addition of another mole of hydrogen. In the second stage the conversion to the carbinol is completed by the addition of a mole hydrogen to the remainder of the aldehydic intermediate product. While the invention is mainly interesting at present for producing carbinols, and particularly alcohols, it is not restricted thereto. Thus, as is known, other oxygenated derivatives, e. g. the corresponding acids, may be also produced by the simultaneous use of other suitable additional reactants, e. g. water, in the feed to the process. In other words, while the method and apparatus of the present invention are at present mainly interesting for the production of carbinols, they may be employed with advantage in any of the many known possible syntheses of this general type wherein an oxygen-containing compound is synthesized by the addition of carbon monoxide and hydrogen to an unsaturated linkage and wherein operation in two stages has advantages.

Up to the present the different stages of the synthesis were carried out in two separate and distinct reaction systems, each with its separate facilities for the recycling of gas. Owing to this, the process was rather complicated and a complete plant for the production of alcohols with the various high pressure reactors, high pressure separators, high pressure feed pumps, high pressure gas circulation pumps, high pressure heat exchanges and so forth, required a very large capital investment.

Through further research about the nature of the reactions occurring and the reaction conditions to be maintained, it was found that it is possible to obtain several material simplifications of the known processes, which are attended with a reduction of the equipment required and consequently with a reduction of the production costs as well as the investment costs.

In the processes of the present invention instead of using so-called "synthesis gas," two gases are used, namely, a hydrogen containing gas relatively free of carbon monoxide and a gas-containing hydrogen and carbon monoxide relatively rich in carbon monoxide, or even pure carbon monoxide if this is available. In the process of the invention these gases, although separately used, are ultimately mixed. Thus the first-mentioned gas is mixed after use with the second-mentioned gas, thereby providing an optimum composition of the synthesis gas in the respective stages while eliminating one gas recycle.

In the process of the invention the synthesis is carried out in a single high pressure reaction vessel. Since such high pressure reaction vessels are very costly this allows the investment costs for a plant to be considerably reduced.

The invention will be further illustrated with reference to a typical and illustrative operation, namely, the production of a mixture of primary nonyl alcohols by the addition of one mole of carbon monoxide and two moles of hydrogen to a mixture of branched chain octylenes produced by the polymerization of butylene. To aid in the description reference will be had to the attached drawing which is a semi-diagrammatic representation of a reactor and auxiliary apparatus arranged to allow the method to be carried out efficiently. For the sake of clearness this apparatus has been considerably simplified as to things of a purely engineering nature, such as details of construction. These things may vary widely over the range dictated by known engineering design principles of high pressure vessels, cooling coils and the like.

Referring to the drawing, the reactor comprises a pressure resistant outer cylinder or shell 1, having suitable top and bottom closures 2 and 3. Within the outer cylinder is a cylinder 4 open at the top and forming a seal at the bottom. This cylinder may be of thin metal. The top of cylinder 4 is placed at the normal desired liquid level in the reactor. Within cylinder 4 is suspended from the top a second cylinder 5, which extends down near to the bottom leaving a space for liquid to flow down through the inner cylinder and around the bottom to its outside. Inner cylinder 5 is perforated with holes 6, above the normal working level, i. e. above the level of the top of cylinder 4. The concentric cylinders 4 and 5 are of such diameter that the cross sectional area of the inner cylinder is approximately equal to the cross sectional area of the annular space between cylinder 4 and the outer shell 1. The cross sectional area of the annular space between cylinder 4 and 5 is smaller, for example, from one-fourth to one-half as large. Within cylinder 5 are: (1) an inlet pipe for liquid reactants 7; (2) a heat exchange coil 8; and (3) an inlet for synthesis gas 9. These may pass through the top or bottom of the reactor according to the engineering design adapted. In the apparatus illustrated the inlet pipe 7 enters through the bottom and ends at about the normal working level. The heat exchange coil is connected through the top. This heat exchange coil is connected to a suitable boiler system 10 illustrated very diagrammatically. The inlet for synthesis gas is a distributor ring connected through the bottom. This ring is preferably just within cylinder 5, but is shown in a permissible slightly lowered position for the sake of clarity in the drawing. Within the annular space between cylinders 4 and 5 and near the bottom thereof there is placed a second distributor ring 26, which is fed by line 12 entering through the bottom. Another gas distributing ring is placed near the bottom in the annular space between cylinder 4 and the outer shell 1. This distributor ring is also fed by line 12. The temperature in this annular space is preferably controlled by a suitable indirect heat exchange means. This is preferably a heat exchange coil 14. This coil likewise is connected to a suitable boiler system illustrated very diagrammatically at 15. Outlets for liquid reactant are provided on the bottom at points around the annular zone between cylinder 4 and the outer shell. These outlets 16 connect to line 17 with controlled valve 18. Valve 18 is controlled by a conventional liquid level controller 19. An outlet 20 for vapors is provided at the top.

In the process of the invention the olefin to be reacted, for example, the mixture of octylenes, is introduced via line 21. The catalyst, for example the conventional cobalt Fischer-Tropsch catalyst, is carried in suspension on the liquid olefin. The slurry is first preheated by heat exchange with recycle gas in a heat exchanger 22. The preheated slurry is then passed to the reactor being discharged therein near the top of the inner cylinder via line 7. Gases leaving the high pressure vessel through conduit 20 are passed through said heat exchanger and then returned to the reaction space in the inner cylinder via distributor 9. A gas rich in carbon monoxide is supplied to the recycled gas stream through conduit 24 in such an amount as to produce a gas mixture having a suitable composition for the oxo-reaction. In order to avoid excessive accumulation of methane or other inert gases in the recycle gas stream, a small amount of the recycled gas may be bled from the system via line 25. In the inner cylinder the octylenes are contacted with the gas mixture consisting largely of carbon monoxide and hydrogen in the presence of the suspended cobalt catalyst as a result of which aldehydes are chiefly formed under suitable conditions of temperature and pressure. The liquid and gas flow countercurrently. The liquid product, containing the aldehyde and suspended catalyst, flows under the bottom of cylinder 5 and up through the surrounding annular space within cylinder 4. It is contacted in this zone with gas rich in hydrogen introduced via line 12 and distributor 26. In this zone takes place mainly a stripping of carbon monoxide dissolved or formed in the reaction mixture. The liquid reaction product containing the suspended catalyst then flows over the top of cylinder 4 into the surrounding annular space in which the aldehydes are hydrogenated to the nonyl alcohols with the aid of gas rich in hydrogen which is supplied through conduit 12 and distributor 13. The liquid reaction product, containing partially spent catalyst in suspension, is withdrawn from the bottom of the outer annular zone by means of line 17. The level of liquid in the reaction space is maintained substantially constant by the liquid level controller 19, which controls the valve 18.

The excess gases from each of the three zones combine to produce the recycle gas which is withdrawn from the high pressure vessel by conduit 20.

The devices 8 and 14, which serve to cool or heat, are each taken up in a system, with separators 10 and 15 for the separation of vapors formed, e. g. steam.

In the apparatus illustrated the inner vessel is intended for the oxo-reaction and the outer vessel for the hydrogenation of aldehydes. The apparatus can be easily modified to carry out the oxo-reaction in the outer vessel and the hydrogenation in the inner vessel. The annular zone between the inner and outer zones not only serves to increase the efficiency of the hydrogenation stage by removing carbon monoxide, but also serves to a considerable extent to insulate the outer and inner zones so that somewhat different temperatures may be maintained in these separate zones according to the needs of the particular process.

In the process according to the invention the oxo-stage and the hydrogenation stage are preferably carried out at the same pressure, which generally lies between 100 and 300 atm.

The temperatures in the two stages as a rule differ slightly. In the oxo-stage they usually vary between 50° and 300° C., preferably between 100 and 200° C., dependent upon the nature of the initial material and of the catalyst used. With the hydrogenation the temperature is generally a little higher and varies between 100 and 350° C., preferably between 150 and 250° C. Because the reaction spaces for the said reactions are each provided with their own cooling or heating device, and because of the insulating effect of the intermediate zone, different temperatures can be maintained without any difficulty. Thus, some heat will generally be passed through the wall of the inner cylinder 5, which does not produce any difficulties, but if desired, the inner cylinder 5 may be provided with a heat insulating wall. Also, if desired, the vessel may be provided on the outside with a heat insulating covering (not shown). An advantage of the described method and apparatus is that they allow the temperature conditions in the respective zones to be controlled more easily. The transfer of heat from the outer zone to the intermediate zone is considerably greater than from the intermediate zone to the center zone, due in part to the greater surface of the outer cylinder. The body of liquid within the reactor nevertheless acts as a heat reservoir tending to smooth out fluctuations in the temperature.

Research about the nature of the reactions involved has shown that the shortest possible delay between the two stages of the process is very desirable. An added advantage of the described method and apparatus is that this delay is very short. As pointed out, it is usually desired to carry out the hydrogenation stage at a somewhat higher temperature than the oxo-stage. The product of the oxo-stage is preheated in passing up through the intermediate zone and the product is made more susceptible to the hydrogenation by the removal of carbon monoxide during the slight delay.

The throughput rates in both stages are from 0.5 to 5, preferably 1–3 litres of liquid reactant pro litre reaction space per hour. They may be equal or different in the two stages, which may e. g. be controlled by a suitable choice of the cross sections of the reaction spaces. The quantities of gas introduced into the two stages may vary widely, but will usually be between 50 and 300 litres, preferably between 100 and 200 litres, (N. T. P.) pro cm.$^2$ section per hour.

In the hydrogenated final product hydrogen is dissolved, which is liberated when the pressure is let down. If desired, the hydrogen may be returned to the reaction (not shown). The hydrogen which is preferably introduced via distributor 26 serves to decompose any metal carbonyl, e. g. cobalt carbonyl or hydrocarbonyl, formed and displaces dissolved carbon monoxide. The amount of hydrogen used is not critical. The gas mixture (recycle gas plus added gas rich in carbon monoxide) for the oxo-stage preferably consists of a mixture containing carbon monoxide and hydrogen in a ratio corresponding to ratio in which they are consumed in the reaction, which amounts to 1:1 for the pure reaction, but generally is between 1:1 and 1:2 as a result of the accompanying hydrogenation of part of the aldehydes primarily formed. For the hydrogenation a hydrogen-containing gas which is substantially free of carbon monoxide is desirable.

As catalysts may be used, for example, the well known catalysts for the synthesis of hydrocarbons from carbon monoxide and hydrogen, more in particular cobalt-containing catalysts or a suitable carrier such as kieselguhr, or other catalysts known for the oxo-reactions. The catalyst may be suspended in the liquid feed and the final product may be freed of it in a suitable manner, e. g. with the aid of filter presses. The recovered catalyst can be used again, if desired.

We claim:
1. In the synthesis of carbinol derivatives by the catalized addition of carbon monoxide and hydrogen to unsaturated parent compounds the improvement which comprises continuously passing the parent compound in the liquid phase and in the presence of the catalyst through a first-reaction zone maintained under conditions conducive to the oxo-reaction, continuously recycling up through said first-reaction zone a mixture of carbon monoxide and hydrogen in excess of the amount reacted in said first zone, continuously passing the reaction mixture through a second zone surrounding said first zone, continuously contacting the reaction mixture in said second zone with an excess of a gas rich in hydrogen while raising the temperature of the reaction mixture, continuously passing the reaction mixture through a third zone surrounding said second zone, continuously passing hydrogen gas substantially free of carbon monoxide up through the reaction mixture in said third zone at the increased temperature, commingling the excess gas from said zones, and maintaining the ratio of hydrogen to carbon monoxide in said recycled gas stream at substantially the ratio in which the hydrogen and carbon monoxide are used up by reaction in said first zone by the continuous addition of a controlled quantity of a gas rich in carbon monoxide to said recycled gas stream.

2. In the synthesis of carbinol derivatives by the catalized addition of carbon monoxide and hydrogen to unsaturated parent compounds the improvement which comprises continuously passing the parent compound in the liquid phase in the presence of the catalyst downward through a first reaction zone under reaction conditions and countercurrent to a recycled up-flowing mixture of carbon monoxide and hydrogen in excess of the amount reacted in said zone, continuously passing the reaction mixture from said first zone downward through a second reaction zone countercurrent to an up-flowing stream of hydrogen substantially free of carbon monoxide in an amount in excess of the amount reacted in said zone, commingling the excess gas from said zones, and maintaining the ratio of hydrogen to carbon monoxide in said recycled gas stream at substantially the ratio in which the hydrogen and carbon monoxide are used up by reaction in said first zone by the continuous addition of a controlled quantity of a gas rich in carbon monoxide to said recycled gas stream.

3. In the synthesis of carbinol derivatives by the catalyzed addition of carbon monoxide and hydrogen to unsaturated parent compounds, the improvement which comprises passing the parent compound in the liquid phase and in the presence of a catalyst serially through separate but inter-communicating reaction zones maintained at different temperature levels, said zones being in heat exchange relationship, passing a mixture of carbon monoxide and hydrogen in excess of the amount reacted through the first of said zones, passing hydrogen in excess of the amount reacted through the second of said zones, combining the excess gases from said zones, and recycling the combined gases to the first said zone.

PETER VAN'T SPIJKER.
JOHN ALFRED SHERRED.

REFERENCES CITED

The following references are of record in the file of this patent:

UNITED STATES PATENTS

| Number | Name | Date |
| --- | --- | --- |
| 1,311,824 | Lichtenhahn | July 29, 1919 |
| 1,404,709 | Allbright | Jan. 24, 1922 |
| 2,108,133 | McCall | Feb. 15, 1938 |
| 2,134,571 | Morlock | Oct. 25, 1938 |

OTHER REFERENCES

Holroyd, "Information Circular 7370, Report on the Investigation by Fuels and Lubricants Team at the I. G. Farbenendustrie A. G. Leuna Works, Merseburgh, Germany" (July, 1946), pages 89–91 and Fig. XXX.